March 14, 1950     F. M. SEGER ET AL     2,500,166
SYNTHETIC LUBRICANTS
Filed July 15, 1949     3 Sheets-Sheet 3
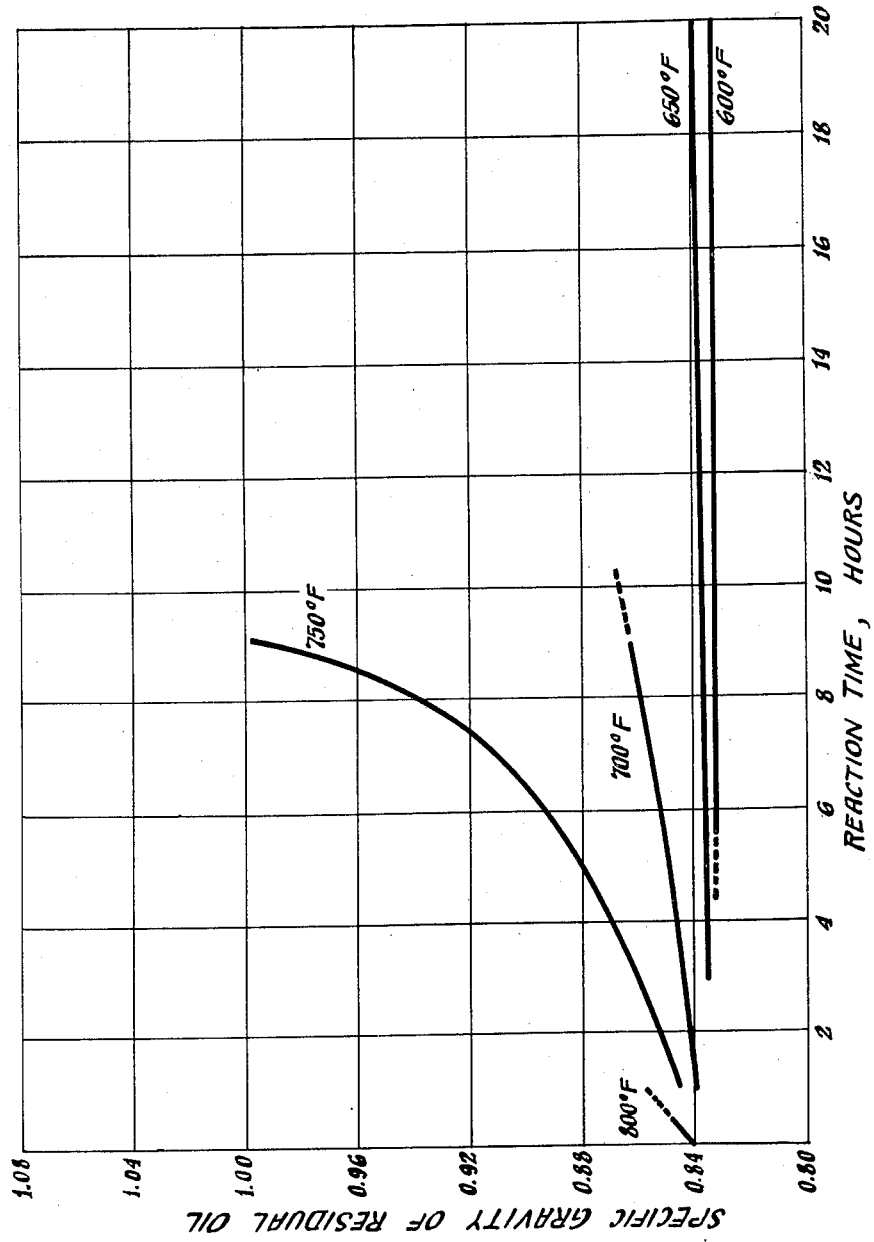
INVENTORS
Francis M. Seger
BY Alexander N. Sachanen
Robert D. Flynn
AGENT OR ATTORNEY Patented Mar. 14, 1950

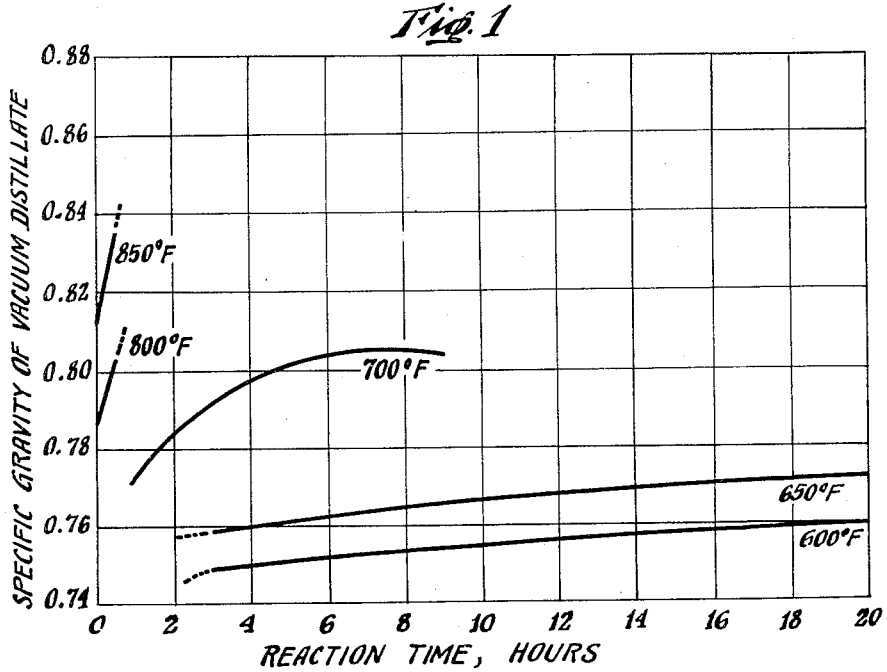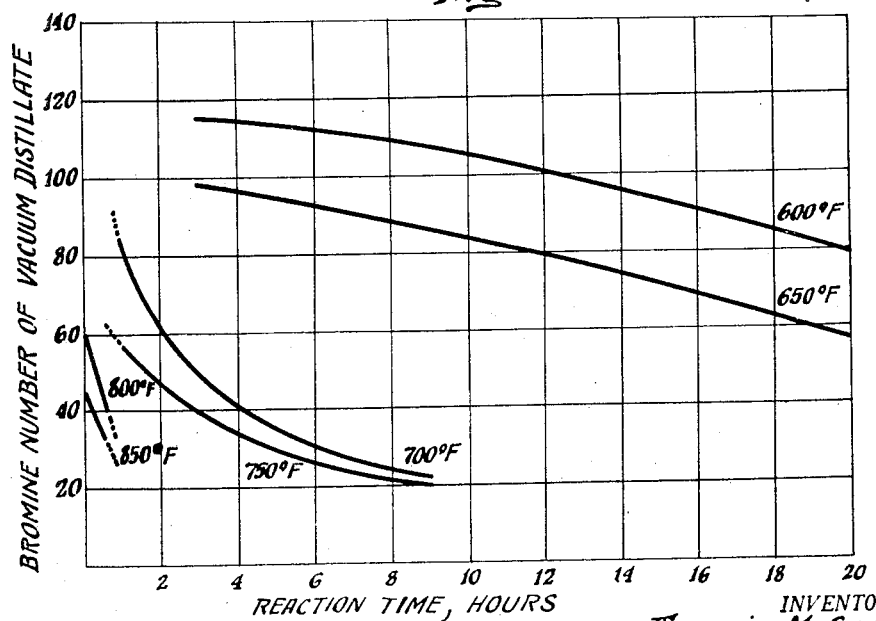

2,500,166

UNITED STATES PATENT OFFICE 2,500,166

SYNTHETIC LUBRICANTS

Francis M. Seger, Pitman, and Alexander N. Sachanen, Woodbury, N. J., assignors to Socony-Vacuum Oil Company, Incorporated, a corporation of New York Application July 15, 1949, Serial No. 104,932
In Canada April 3, 1948

15 Claims. (Cl. 260—683.1)

This invention relates to new synthetic lubricants characterized by an especially desirable combination of low pour point, high viscosity index and good stability, and to a method for their manufacture. More particularly, this invention relates to the efficient manufacture of synthetic lubricants having this highly desirable combination of characteristics from mixtures of normally liquid straight-chain 1-olefins containing from six to twelve carbon atoms, by thermal, but non-catalytic treatment of the olefins.

This application is a continuation-in-part of our application, Serial No. 761,716, filed July 17, 1947, now abandoned.

Polymerization and condensation reactions in general have long been accomplished by the use of either heat or catalysts or both. Olefins have been catalytically polymerized to form oils, particularly with Friedel-Crafts type catalysts such as aluminum chloride. It has been found that cyclic and highly branched olefins are converted in the presence of $AlCl_3$ to oils of poor viscosity index (V. I.), while oils obtained from normal or straight chain olefins with the same catalyst have much better V. I. This is described in detail by Sullivan, Voorhees, Neely and Shankland in Industrial and Engineering Chemistry, 23, 604–611 (June 1931), as well as by Koch and Hilberath in Brennstoffe Chemie, 23, 67 (1942). Olefins have also been polymerized to higher olefins when heated in the presence of small amounts of oxygen, at temperatures of 400–700° C. (752–1292° F.) for several seconds, as described by Lenher in United States Letters Patent No. 2,000,964. In the latter process, for example, an olefin such as ethylene is polymerized to propylene and, to a lesser degree, to butylene and amylenes.

As indicated above, olefins have also been polymerized by heat alone. By way of illustration, Batchelder and Kuentzel have converted normally gaseous olefins, such as ethylene, into high viscosity index lubricants in the absence of active catalysts, at temperatures of 500° F. to 750° F.; this is described in United States Letters Patent 2,111,831. Engler and Routala—Berichte, 42, 4620 (1909)—heated methyl butene-2 at 320–325° C. (608–617° F.) for 32 days and obtained a small quantity of an oily residue. Hexene-2 was similarly treated, with the formation of a small amount of lubricating oil. Nemtzov et al.—J. Gen'l. Chem. (Russ) 8, 1314–1324 (1938)—thermally polymerized a mixture of straight chain octenes, with the ratio of alpha- and beta- (or 1- and 2-) isomers approximately 40:60. The products obtained from such an olefin charge were principally octene dimers, containing only a very small quantity of higher polymers. Tilicheyev and Feigin—Proc. Conference on Cracking (Russ.), 269–280 (1931)—thermally polymerized caprylene and hexadecene, at a temperature of 425° C. (797° F.).

Polymerization and cracking of olefins have also been described by Hugel and Cohn (Chimie & Industrie, Special No. 201-202 (March 1930)). An alpha octene, having a boiling point of 122–123° C., was thermally treated at 400° C. (752° F.) under pressure; hexadecene was similarly treated at 300° C. (572° F.) for twenty-four hours. The polymers obtained by such thermal treatments were primarily dimers and trimers, and the products obtained from hexadecene were solids or semi-solids resembling paraffin wax. Thermal polymerization of hexadecene is further described by Hugel and Artichevitch, Annales Combustibles Liquides, 3, 985–1027 (1928) and by Hugel and Kohn, Annales Combustibles Liquides, 7, 15–54 (1932).

Prior to the present invention described in our aforesaid application, however, it was not known that straight chain 1-olefins such as normal decene-1 could be polymerized or condensed by heat alone to form synthetic oils in commercially feasible yields, such oils having an exceptional combination of properties. Briefly, the invention is based upon the discovery that straight-chain 1-olefins containing between six and about twelve carbon atoms per molecule are converted into synthetic oils having an exceptionally desirable combination of characteristics when thermally treated, in the absence of catalysts and under controlled reaction conditions.

The oils of this invention differ from oils produced catalytically, or by a combination of catalytic and thermal treatments, in that the characteristics of the resultant oils are quite different and far more desirable. Prior to this invention it was not kown that oils could be produced in the manner herein described, at all, and, of course, it was therefore not known that oils thus produced would have an unusually desirable combination of characteristics. Quite unexpectedly the oils of the present invention possess a combination of very low pour point, very high viscosity index and very good stability. Bromine addition tests indicate the existence of a considerable degree of unsaturation, but this does not appear to affect the stability.

Reactants

The reactants for the production of synthetic oils in accordance with this invention are normally liquid, straight-chain 1-olefins ranging from hexene-1 to dodecene-1, inclusive. It must be clearly understood that by straight-chain 1-olefins we mean mono-olefins containing the double bond in the alpha position and having a normal structure. In accordance with our invention, the most desirable synthetic oils are produced from straight-chain 1-olefins containing not less than eight nor more than eleven carbon atoms per molecule.

The state of purity of the straight-chain 1-olefin charge does not appear to be especially critical. Although it is desirable to have a starting material which contains as large a percentage of the above described 1-olefins as possible, it is permissible to have present lesser amounts of other olefins and of other hydrocarbon materials. In general, the olefinic charge stock preferably should contain less than about 20% by weight of unsaturated hydrocarbons other than straight-chain 1-olefins having not less than six nor more than about twelve carbon atoms per molecule. However, since paraffins are not involved in polymerization, we have found that charge stocks containing as much as 50% by weight of paraffinic hydrocarbons with the balance straight-chain 1-olefins having between six and about twelve carbon atoms per molecule are entirely satisfactory for our purpose. In many instances, in commercial operation, it will be found desirable to use technical grades of such olefins as octene-1 or decene-1. Mixed olefinic materials derived from the thermal cracking of wax or from the Fischer-Tropsch process constitute satisfactory charging stocks. In this connection, it must be noted that it is suspected that substantially straight-chain 1-olefins having beween six and about twelve carbon atoms per molecule, i. e., 1-olefins in which the length of side chain or chains is short relative to the length of the main chain, are also suitable, although less preferred charge stocks for the purpose of the present invention. However, in view of the fact that such olefins are unavailable, no test data can be adduced to confirm this suspicion.

It will be understood, therefore, that the reactant or charge material used herein is of hydrocarbon character and predominantly comprised of at least one of the normal, alpha mono-olefins described above.

Synthetic lubricants made from substantially pure normal, alpha mono-olefins under the conditions described below, are oils of medium viscosity, pale color and good stability. When an olefinic charge stock highly contaminated with aromatic hydrocarbons or with oxygen-containing materials, is used, a product of inferior character is generally obtained. While this condition has not been thoroughly correlated with charge distribution, it has been observed that olefinic charge stocks so contaminated give rise to unstable products which are not suited for lubricating oil use. This is evidenced by a very dark color, excessive carbon residue (Conradson or Ramsbottom), and a tendency to deposit dark insoluble materials on storage.

Tests indicate that when relatively pure, single olefins are used they should preferably contain not less than seven nor more than eleven carbon atoms per molecule, although mixtures of olefins containing an average of as few as six or as many as twelve carbon atoms per molecule are satisfactory.

REACTION CONDITIONS

The most critical reaction condition is temperature, and this condition is closely interrelated with reaction time and pressure. The range of temperatures that produces satisfactory, commercially feasible yields of high quality synthetic oils varies from about 600° F. to about 700° F. At temperatures between 500° F. and 600° F. the conversion takes place at a slower rate and is usually less complete. At temperatures greater than 700° F., side and secondary reactions begin to occur and increase in importance to such an extent that at temperatures above about 750° F. the process again becomes impracticable.

These side and secondary reactions are chiefly the following:

1. The volatile non-oily components of the reaction mixture become progressively more saturated, as indicated by a decrease in bromine addition number and, therefore, less suitable for recycling for further conversion;
2. Cracking begins, as evidenced by greater gas pressure and decrease in oil yields; and
3. Cyclization begins, as evidenced by some decline in viscosity index with accompanying increase in gravity and refractive index.

The time of reaction varies inversely with temperature and, as indicated above, is closely interrelated with temperature. Good products and good yields have been produced with times as short as one hour or less at temperatures of the order of 750° F., and as long as thirty hours at temperatures of about 600° F. Advantageously, the time is in the neighborhood of five to twenty hours at about 600° F., and one to five hours at 700° F. A range of time of from three to twenty hours at temperatures ranging from 650° F. to about 600° F. is considered most advantageous for straight-chain 1-olefins having eight to eleven carbon atoms per molecule.

Test data also indicate that reasonable yields of products of comparatively high viscosity index may be obtained at temperatures of 750° F. to 800° F. and times of several minutes. These conditions are less advantageous, however, because the products frequently have higher pour points, and the material that is not converted into oil is partially degraded into light fractions of a relatively low degree of unsaturation which are therefore much less desirable as recycle stock. The viscosity index decreases sharply with prolonged exposure to these higher temperatures.

Pressure to be used is not especially critical. It will usually be around 200 to 1000 pounds per square inch or higher depending upon the vapor pressure of the olefin reactant. Increased pressure is desirable, and, as expected, increases the oil yields, particularly at the comparatively higher temperatures (as 700–750° F.) and with the lower molecular weight olefins (e. g., $C_6$—$C_8$). The use of pressures of at least about 100 pounds per square inch is within the scope of this invention, with pressures upwards of 500 pounds per square inch being preferred.

It is within the scope of this invention to perform the reaction or conversion either by a batch process or a continuous process, and to recycle unconverted olefin reactant or partially converted olefin reactant for further conversion.

Further details and advantages of this invention are illustrated by the following examples which have been set forth in tabular form below. The reactions or conversions summarized in the table were conducted in shaker-type pressure bombs (American Instrument Co.), and the autogeneous pressure due to the heating of the olefin reactant was used. The olefin charges were charged to the bombs, the bomb heads secured and the bombs flushed with nitrogen (unless indicated otherwise) to displace air present therein. The bombs were then heated (while rocked) to the desired temperature for the desired length of time. Thereafter, the bombs were either cooled and discharged, or discharged immediately through a condensing system while the bombs were still at the reaction temperature.

It should be noted that the reaction times, recited as "time, hours" in the tables, represent the time intervals during which the bombs were maintained at the desired temperature, and do not include the time intervals necessary to heat the bombs and their contents to the desired temperature, and do not include the time intervals necessary to cool the bombs after heat to the bombs has been discontinued. In general, about one and one-half hours are required to raise the temperature from 60–80° F. to 700° F., and about eight hours to cool thereafter to 60–80° F., in runs such as shown in the tables. However, as indicated above, substantially no polymerization occurs below 500° F. and little occurs between 500° F. and 600° F.; therefore, these times are of little significance.

The examples given in the tables were made under directly comparable conditions. The products discharged from the bombs were vacuum topped to remove any unreacted charge and any low-boiling materials, leaving the synthetic oils of this invention as a residue. To distinguish the synthetic oils from the distillate fractions, the refined oils are therefore identified as "residual oils." The latter term indentifies the oils from which unreacted materials and products of intermediate boiling range have been separated.

In the tables, the pressure is given in pounds per square inch, gauge pressure. The yield is given as weight per cent of the charge, although in each run there was some material lost in the process so that the actual efficiency of the process was somewhat higher than indicated.

All of the tests and analyses to which the residual oils in the tables were subjected are well known standard tests. In this connection, it will be noted that the designation "N. N." refers to the neutralization number, which is a measure of the acidity of the oil. The Saybolt viscosity given is that calculated from measurement of the kinematic viscosity.

In Table I below, several comparable runs are shown for conversions of decene-1.

TABLE I

*Thermal conversion of decene-1*

| Run No. | Temp., °F. | Time, Hours | Pressure Gauge | Yield Percent Charge | Viscosity @ 210° F. | V. I. | Pour Point | Bromine No. | Specific Gravity | Neut. No. | Refr. Index |
|---|---|---|---|---|---|---|---|---|---|---|---|
| 1 | 400 | 9 | 150 | 1.78 | 37.92 | 76.4 | | 20.8 | 0.8580 | | 1.4568 |
| 2 | 400 | 20 | <100 | 0.8 | 51.65 | 129.5 | −15 | 14.5 | | 1.0 | |
| 3 | 510 | 10 | 300 | 6.43 | 40.79 | 146 | | 22.6 | 0.8309 | | 1.4595 |
| 4 | 500 | 20 | <50 | 5.6 | 60.95 | 128.5 | <−30 | 11.3 | 0.8529 | 1.0 | |
| 5 | 505 | 40 | 100 | 12.9 | 60.01 | 130.4 | <−30 | 8.5 | 0.8438 | 0.5 | |
| 6 | 610 | 10¼ | 300 | 48.6 | 44.92 | 143 | −20 | 17.0 | 0.8333 | 0.3 | 1.4632 |
| 7* | 600 | 10 | 600 | 43.2 | 43.67 | 149 | −15 | 18.0 | 0.8343 | 0.5 | 1.4618 |
| 8 | 603 | 15 | 210 | 57.5 | 44.81 | 147 | −25 | | 0.8328 | | |
| 9 | 605 | 20 | 200 | 66.3 | 45.16 | 143 | −10 | 15.1 | 0.8368 | Nil | |
| 10 | 650 | 3 | 250 | 34.0 | 45.51 | 142 | −10 | 16.2 | 0.8348 | 0.1 | |
| 11 | 655 | 5 | <100 | 52.9 | 43.66 | 140.5 | −5 | 21.0 | 0.8294 | Nil | |
| 12 | 650 | 10 | 250 | 64.3 | 45.13 | 142 | −5 | 17.0 | 0.8373 | Nil | |
| 13 | 652 | 15 | 350 | 65.3 | 44.46 | 142 | −5 | 17.5 | 0.8388 | Nil | |
| 14 | 650 | 19½ | 250 | 66.5 | 45.32 | 141 | −10 | 16.6 | 0.8398 | 0.1 | |
| 15 | 660 | 9½ | 500 | 31.4 | 44.88 | 135 | −10 | 14.5 | 0.8378 | 0.4 | 1.4651 |
| 16 | 700 | 9½ | 800 | 40.0 | 42.54 | 130.9 | −10 | 13.7 | 0.8438 | 0.4 | 1.4672 |
| 17 | 700 | 1 | 300 | 33.8 | 47.69 | 136.5 | −20 | 15.6 | 0.8393 | 0.5 | |
| 18 | 700 | 3 | 200 | 48.4 | 50.20 | 131.7 | −30 | 15.0 | 0.8443 | 0.3 | |
| 19 | 705 | 5 | 100 | 38.8 | 48.82 | 128.2 | <−30 | 12.2 | 0.8488 | 0.1 | |
| 20 | 708 | 9 | 850 | 18.2 | 43.21 | 95.0 | | | 0.8453 | | |
| 21 | 750 | (1) | 300 | 36.6 | 44.34 | 133.7 | 15 | 19.5 | 0.8453 | Nil | |
| 22 | 750 | 3 | 600 | 30.0 | 40.31 | 116.3 | 10 | 23.1 | 0.8639 | 1.5 | |
| 23 | 750 | 5 | 650 | 26.6 | 40.31 | 109 | <−30 | 21.5 | 0.8778 | 0.1 | |
| 24 | 745 | 9 | 1,100 | 9.6 | 72.57 | 27.2 | −5 | 27.5 | 0.9786 | 0.5 | |
| 25 | 800 | (2) | 500 | 26.2 | 44.66 | 134.5 | 20 | 22.9 | 0.8478 | Nil | |
| 26 | 800 | (3) | 350 | 25.7 | 43.27 | 142 | 15 | 20.2 | 0.8398 | 0.1 | |
| 27 | 800 | (4) | | 25.6 | 43.73 | 130 | −20 | 21.8 | 0.8514 | 0.3 | |
| 28 | 850 | (5) | 850 | 13.5 | 41.73 | 112.5 | +10 | 29.0 | 0.8702 | 0.4 | |
| 29 | 850 | (6) | 2,500 | 6.3 | 119.2 | <0 | +45 | 45.2 | | 0.8 | |

(All reactions conducted in an atmosphere of N₂ unless otherwise specified.)
* Run in atmosphere of air.
Explanation of the following:
(1) Bomb discharged immediately after one hour reaction time.
(2) Bomb discharged immediately after reaching 800° F., 13 minutes required for draining.
(3) Bomb discharged immediately after reaching 800° F., 8 minutes required for draining.
(4) Bomb discharged immediately after 30 minute reaction at 800° F., 8 minutes required for draining.
(5) Bomb discharged immediately after reaching 850° F., 18 minutes required for draining.
(6) Bomb discharged immediately after 30 minute reaction at 850° F., 31 minutes required for draining.

Referring more particularly to Table I, it will be apparent that, although synthetic oils can be produced over a somewhat wider range of temperatures, the most desirable combination of high yield, high viscosity index, and low pour point occurs in the range of temperatures varying from about 600° F. to about 700° F., with times varying from about ten hours to about three hours respectively, and with a pressure of at least about 200 pounds per square inch. It will also be apparent that pressure above about 200 pounds per square inch is not a critical factor; however, as far as is known at present, pressures of around 500 to 1000 pounds per square inch appear preferable.

As shown by runs Nos. 25 through 29 carried out at temperatures of 800–850° F., yields of synthetic oils are generally not more than about 25 per cent. These yields are in contrast to yields of 35–65 per cent obtained at preferred operating conditions of 600–750° F. for 20 hours to one hour. Furthermore, at the higher temperatures of 800–850° F., a substantial portion of the decene-1 charge is degraded by cracking and other side reactions, such that recovered material is unsuitable for recycling. In a continuous operation at 800–850° F., therefore, the ultimate yield of synthetic oil is appreciably lower than the ultimate yield obtained in a continuous operation at the aforesaid preferred conditions at 600–750° F.

This relationship is illustrated graphically by data presented in Figures 1 and 2. In Figure 1, the specific gravity of the recovered distillate is plotted against reaction time at various operating temperatures. As shown, the specific gravity changes only slightly when operating temperatures of 600–700° F. and times of 20 hours to one hour are used. This is in contrast with the very great change in specific gravity at temperatures of 800–850° F. using even shorter reaction times to minimize degradation. Figure 2 shows the relationship between bromine number (or unsaturation) of the recovered distillate and reaction time at various operating temperatures. The change of bromine number at temperatures of 600–750° F. with times of 20 hours to one hour, is much less than at the higher temperatures of 800–850° F.

A further illustration of the value of a continuous operation under the conditions contemplated herein, is shown by the following example. A quantity, 22.39 pounds, of n-decene-1 was heated in an autoclave, equipped with stirring means, at 600° F. for 10 hours. The maximum pressure developed during the reaction or conversion period was 5000 pounds per square inch, and the autoclave was vented several times to reduce the pressure to 4000 pounds per square inch. The autoclave was cooled and then discharged. The material obtained was treated in the manner described above in connection with Table I. A second run was made in the autoclave under the same conditions, using 21.43 pounds of n-decene-1. The residual oils of the two runs were combined, and the combined oils constitute a yield of 38.4 per cent, by weight.

The residual oil had a pour point of −45° F., a V. I. of 133.1 and a specific gravity of 0.8408.

The distillates recovered in both runs were also combined, and constituted 55.5 per cent, by weight, of the total charge. The combined distillates had a specific gravity of 0.7612 and a bromine addition number of 94.6. A quantity, 19.76 pounds, of the recovered distillates was then charged to the autoclave and heated at 600° F. for ten hours. In this run, the maximum pressure developed was 1900 pounds per square inch. The residual oil obtained in this run was 28.3 per cent, by weight, and recovered distillate represented 67.6 per cent, by weight, of the charge to the autoclave.

An indication of the interrelationships between temperature and reaction time upon the characteristics and yields of the synthetic oils may be obtained by reference to the appended drawings, in which:

Figure 5 is a graphic representation of the effect of temperature and reaction time upon specific gravity.

Figure 3:
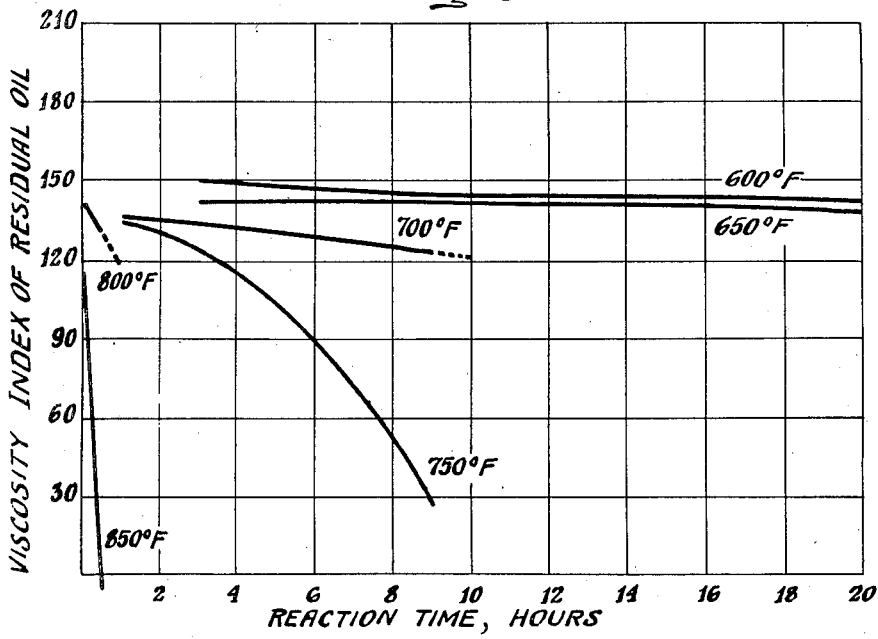
Figure 3 is a graphic representation of the effect of temperature and reaction time upon viscosity index.
Figure 4:
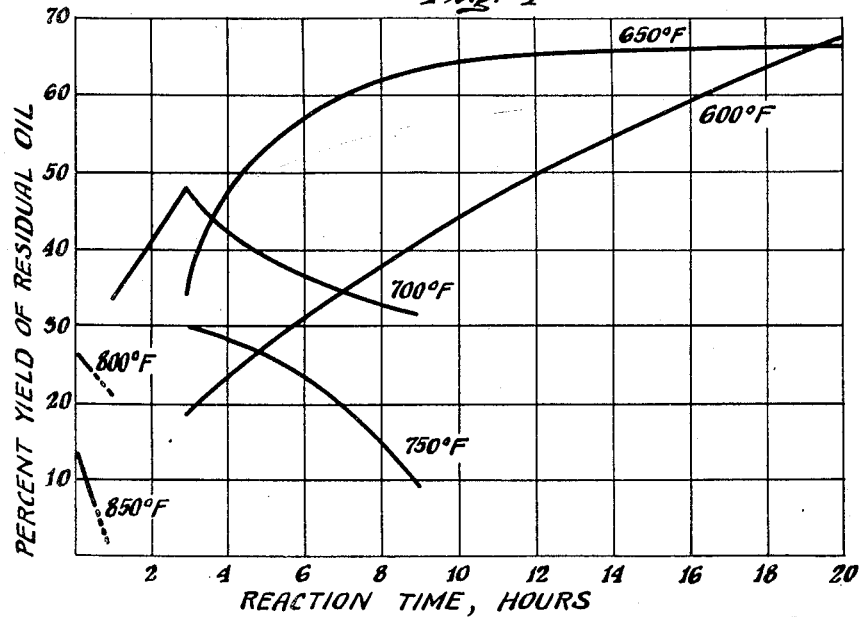
Figure 4 is a graphic representation of the effect of temperature and reaction time upon yield.

Data for Figures 1 through 5 were obtained by a series of tests made on decene-1. The yield at 700° F. and using a three hour reaction time was 48.4% weight percent of the charge, and the product had a viscosity index of 131.7 and a pour point of −30° F. It will also be noted that yields of about 65 weight per cent were obtained at 650° F.

The tests set forth in Table II, below, were performed for the purpose of determining the type of olefins utilizable in accordance with the present invention, and serve to demonstrate the critical nature of the normal, alpha mono-olefin reactants contemplated herein. Isobutylene, pentene-2, 2-ethyl hexene-1, and $C_3$-polymer are examples of materials which are either branched chain, or which contain their double bond in other than the alpha position. The octene-2 used comprised approximately 58 per cent of n-octene-2 and approximately 42 per cent of n-octene-1 and serves a two-fold purpose, namely: to illustrate an olefin having the double bond in the beta position (n-octene-2), and to demonstrate the necessity for a charge stock containing only a relatively small quantity of olefins other than a normal alpha mono-olefin (as n-octene-1).

TABLE II

*Thermal conversion of other olefins*

| Olefin | Temp., °F. | Time, Hours | Pressure Gauge | Yield | Viscosity @ 210° F. | V. I. | Pour Point | Bromine No. | Specific Gravity | Neut. No. |
|---|---|---|---|---|---|---|---|---|---|---|
| Propylene | 610 | 10 | 1,500 | 5.9 | 30 | | <−30 | 62.8 | 0.7887 | 1.4 |
| Do | 650 | 10 | 2,400 | 8.5 | 43.6 | −85 | −25 | 46.9 | 0.9705 | 1.3 |
| Butene-1 | 650 | 9 | 1,600 | 3.0 | 37.98 | 35.8 | <−30 | 28.9 | 0.8462 | 10 |
| Isobutylene [1] | 650 | 10 | 2,325 | 2.8 | 43.79 | <0 | | 44.7 | 0.8822 | |
| Pentene-2 | 605 | 10 | 1,725 | 2.5 | 30 | | <−30 | 85.8 | 0.7778 | 1.2 |
| Hexene-1 | 610 | 9½ | 900 | 9.9 | 37.67 | 85.0 | <−65 | 20.5 | 0.8294 | 0.1 |
| 2-Ethyl hexene-1 | 650 | 9 | 1,150 | 1.5 | 34.04 | 51.7 | <−30 | 51.7 | | 1.95 |
| Octene-2 [2] | 650 | 20 | 900 | 10.5 | 37.09 | 34.8 | <−30 | 52.1 | 0.8607 | 1.0 |
| $C_3$ Polymer [3] | 640 | 9 | 600 | 1.74 | | | | | | |
| Octene-1 [4] | 600 | 28 | 1,400 | 45.0 | 43.92 | 128.4 | <−70 | 14.3 | 0.8338 | 0.1 |
| Do | 610 | 10 | 700 | 29.6 | 43.14 | 126.2 | <−70 | 14.9 | 0.8413 | 0.2 |
| Dodecene-1 | 600 | 10 | 250 | 50.0 | 45.18 | 152.6 | +25 | 16.2 | 0.8294 | 0.2 |
| Do | 710 | 5 | 250 | 61.4 | 43.34 | 150 | +45 | 15.7 | 0.8348 | 0.2 |
| Hexadecene-1 | 660 | 11 | 200 | 54.8 | 50.47 | 146 | +75 | 12.8 | 0.8368 | 0.3 |

(All reactions conducted in an atmosphere of $N_2$ unless otherwise specified.)
[1] Bomb evacuated to give no atmosphere other than isobutylene.
[2] Approximately 58% n-octane-2 and 42% n-octane-1.
[3] Mainly mixed nonenes of branched structure.
[4] Approximately 90% n-octene-1.

From inspection of the results set forth in Table II, it is apparent that the yields from all olefins other than normal, alpha mono-olefins of six to twelve carbon atoms, are very low and none of the products therefrom has a satisfactory combination of characteristics. It should be noted in connection with the n-octene-2 example, the yield and characterizing properies of the oil product would be of even lower calibre if the charge were substantially pure n-octene-2. A comparison of the run with the crude octene-2 with those involving octene-1 shows a substantial difference in yield, 10.5 percent as compared with 29.6 to 45.0 per cent. Most striking, perhaps, is the great difference in V. I., 34.8 for the octene-2 product compared with 126.2–128.4 for the octene-1 products. The critical nature of olefin structure is further revealed by the results with 2-ethyl hexene-1, in which case the yield was but 1.5 per cent and the V. I. only 51.7.

The influence of chain length of the normal, alpha mono-olefin is shown by the results with butene-1 and with hexadecene-1. The yield is but 3.0 per cent and the V. I. but 35.8, when butene-1 is used. An undesirably high pour point of +75° F. characterizes the hexadecene-1 product.

With octene-1, decene-1 and dodecene-1 greatly improved yields are obtained but with dodecene-1 the pour points are far too high for the products to be considered satisfactory for most purposes.

From the foregoing and as stated hereinbefore, it is believed that, by adjustment of the reaction conditions, usable products can be obtained from straight-chain 1-olefins or mixtures thereof, having not less than six nor more than twelve carbon atoms per molecule, and this is particularly true, if the olefins contain not less than eight nor more than eleven carbon atoms per molecule.

It will be understood from the foregoing that the process contemplated herein is of thermal character and does not involve the use of catalysts, such as Friedel-Crafts catalysts, shown in the prior art mentioned above. Accordingly, the process is properly identified as thermal and non-catalytic.

We claim:

1. The method for preparing a viscous oil from a normal, alpha mono-olefin having between six and about twelve carbon atoms per molecule, which comprises: thermally and non-catalytically heating a hydrocarbon charge consisting essentially of said olefin at a temperature between about 600° F. and about 750° F. for a period of time from about twenty hours to about one hour, respectively.

2. The method for preparing a viscous oil from a normal, alpha mono-olefin having between six and about twelve carbon atoms per molecule, which comprises: thermally and non-catalytically heating a hydrocarbon charge consisting essentially of said olefin at a temperature between about 600° F. and about 750° F. for a period of time from about twenty hours to about one hour, respectively, and at an elevated pressure of at least about 100 pounds per square inch.

3. The method for preparing a viscous oil from a normal, alpha mono-olefin having between six and about twelve carbon atoms per molecule, which comprises: thermally and non-catalytically heating a hydrocarbon charge consisting essentially of said olefin at a temperature between about 600° F. and about 750° F. for a period of time from about twenty hours to about one hour, respectively; and separating from the reaction product thus formed a viscous oil.

4. The method for preparing a viscous oil from a normal, alpha mono-olefin having between six and about twelve carbon atoms per molecule, which comprises: thermally and non-catalytically heating a hydrocarbon charge consisting essentially of said olefin at a temperature between about 600° F. and about 700° F. for a period of time from about five to twenty hours at 600° F. to about three to five hours at 700° F.

5. The method for preparing a viscous oil from a normal, alpha mono-olefin having between about eight and about eleven carbon atoms per molecule, which comprises: thermally and non-catalytically heating a hydrocarbon charge consisting essentially of said olefin at a temperature between about 600° F. and about 700° F., for a period of time from about five to twenty hours at 600° F. to about three to five hours at 700° F.

6. The method for preparing a viscous oil from n-decene-1, which comprises: thermally and non-catalytically heating a hydrocarbon charge consisting essentially of said n-decene-1 at a temperature between about 600° F. and about 700° F. for a period of time from about five to twenty hours at 600° F. to about three to five hours at 700° F.

7. The method for preparing a viscous oil from a normal, alpha mono-olefin having between six and about twelve carbon atoms per molecule, which comprises: thermally and non-catalytically heating a charge consisting essentially of hydrocarbons containing at least about 80 per cent of said normal, alpha mono-olefin, at a temperature between about 600° F. and about 750° F. for a period of time from about twenty hours to about one hour, respectively.

8. The method for preparing a viscous oil from a mixture of normal, alpha mono-olefins having between six and about twelve carbon atoms per molecule, which comprises: thermally and non-catalytically heating a hydrocarbon charge consisting essentially of said mixture of olefins at a temperature between about 600° F. and about 750° F. for a period of time from about twenty hours to about one hour, respectively.

9. The continuous method for preparing a viscous oil from a normal, alpha mono-olefin having between six and about twelve carbon atoms per molecule, which comprises: thermally and non-catalytically heating a hydrocarbon charge consisting essentially of said olefin at a temperature between about 600° F. and about 750° F. for a period of time from about twenty hours to about one hour, respectively; separating from the reaction product thus formed a viscous oil and a fraction containing said normal, alpha mono-olefin in unconverted form; and recycling said fraction under the said conditions of temperature and time.

10. A viscous oil characterized by high viscosity index and low pour point, and obtained by: thermally and non-catalytically heating a hydrocarbon charge consisting essentially of a normal, alpha mono-olefin having between six and about twelve carbon atoms per molecule, at a temperature between about 600° F. and about 750° F. for a period of time from about twenty hours to about one hour, respectively, and separating from the reaction product thus formed said viscous oil.

11. A viscous oil characterized by high viscosity index and low pour point, and obtained by: thermally and non-catalytically heating a hydrocarbon charge consisting essentialy of a normal, alpha mono-olefin having between six and about twelve carbon atoms per molecule, at a temperature between about 600° F. and about 700° F. for a period of time from about five to twenty hours at 600° F. to about three to five hours at 700° F., and at an elevated pressure of at least about 100 pounds per square inch, and separating from the reaction product thus formed said viscous oil.

12. A viscous oil characterized by high viscosity index and low pour point, and obtained by: thermally and non-catalytically heating a hydrocarbon charge consisting essentially of a normal, alpha mono-olefin having between about eight and about eleven carbon atoms per molecule, at a temperature between about 600° F. and about 700° F. for a period of time from about five to twenty hours at 600° F. to about three to five hours at 700° F., and separating from the reaction product thus formed said viscous oil.

13. A viscous oil characterized by high viscosity index and low pour point, and obtained by: thermally and non-catalytically heating n-decene-1, at a temperature between about 600° F. and about 700° F. for a period of time from about five to twenty hours at 600° F. to about three to five hours at 700° F., and separating from the reaction mixture thus formed said viscous oil.

14. A viscous oil characterized by high viscosity index and low pour point, and obtained by: thermally and non-catalytically heating a charge consisting essentially of hydrocarbons containing at least about 80 per cent of normal, alpha mono-olefin having between six and about twelve carbon atoms per molecule, at a temperature between about 600° F. and about 750° F. for a period of time from about twenty hours to about one hour, respectively.

15. A viscous oil characterized by high viscosity index and low pour point, and obtained by: thermally and non-catalytically heating a hydrocarbon charge consisting essentially of a mixture of normal, alpha mono-olefins having between six and about twelve carbon atoms per molecule, at a temperature between about 600° F. and about 750° F. for a period of time from about twenty hours to about one hour, respectively, and separating from the reaction product thus formed said viscous oil.

FRANCIS M. SEGER.
ALEXANDER N. SACHANEN.

REFERENCES CITED

The following references are of record in the file of this patent:

UNITED STATES PATENTS

| Number | Name | Date |
|---|---|---|
| 2,000,964 | Linker | May 14, 1935 |
| 2,111,831 | Batchelder et al. | Mar. 22, 1938 |
| 2,315,080 | Reid | Mar. 30, 1943 |

OTHER REFERENCES

Oil and Gas Journal, March 28, 1935, pages 81 to 96.